United States Patent [19]
Hörmann et al.

[11] Patent Number: 5,700,418
[45] Date of Patent: Dec. 23, 1997

[54] METHOD OF MANUFACTURE OF COMPONENTS MADE OF SINTERED INDIUM-TIN-OXIDE SOLID-SOLUTION CRYSTALS

[75] Inventors: Michael Hörmann, Mömbris; David Francis Lupton, Gelnhausen; Jörg Schielke, Bruchköbel; Friedhold Schölz, Rodenbach, all of Germany

[73] Assignee: W.C. Heraeus GmbH, Hanau, Germany

[21] Appl. No.: 504,334

[22] Filed: Jul. 19, 1995

[30] Foreign Application Priority Data

Jul. 29, 1994 [DE] Germany .................. 44 27 060.7

[51] Int. Cl.$^6$ ............ C04B 33/34; C04B 37/00; A61K 33/36; B29B 35/71
[52] U.S. Cl. ............................ 264/604; 264/122
[58] Field of Search ............ 65/17.3, 17.4, 65/32.1; 264/56, 60, 65

[56] References Cited

U.S. PATENT DOCUMENTS

| 4,690,745 | 9/1987 | Klein .................. 204/192.29 |
| 5,401,701 | 3/1995 | Ogawa et al. ........... 501/134 |
| 5,435,826 | 7/1995 | Sakakibara et al. ....... 75/232 |

FOREIGN PATENT DOCUMENTS

| A-386932 | 9/1990 | European Pat. Off. |
| A1 0 584 672 | 3/1994 | European Pat. Off. |

OTHER PUBLICATIONS

H. Enoki et al., *Journal of Materials Science*, 26, 4110–4119 (1991), "The intermediate compound in the $In_2O_3$–$SnO_2$ system".

Derwent Publication AN 94–32156 of JP-A-05 339 721, Database WPI, Week 9404, Dec. 21, 1993.

Patent Abstracts of Japan of JP-A-05 170513, vol. 17, No. 577 (C–1122), Oct. 20, 1993.

B.G. Lewis et al., "Structure and Performance of ITO Sputtering Targets", Arconium Specialty Alloys, Providence, RI 02909 (SVC–Proceedings, Boston, MA), (1994).

Patent Abstracts of Japan of JP 2-115326 A, Sect. C., vol. 14 (1990), No. 322 (C–739).

*Primary Examiner*—Donald E. Czaja
*Assistant Examiner*—Jacqueline A. Ruller
*Attorney, Agent, or Firm*—Frishauf, Holtz, Goodman, Langer & Chick, P.C.

[57] ABSTRACT

A component made of sintered oxides of indium and tin and a method of manufacturing such a component. The mean size of the oxide particles is larger than 2 μm. The empirical density of the component is more than 95% of theoretical. The component is characterized in that at least 97 weight % of the oxide particles are solid solution crystals with a crystalline matrix of indium oxide. The method comprises molding a green body of a powder of indium-oxide and tin-oxide solid solution and sintering the green body at a temperature less than 1100° C. and preferably between 800° and 1050° C.

11 Claims, 4 Drawing Sheets

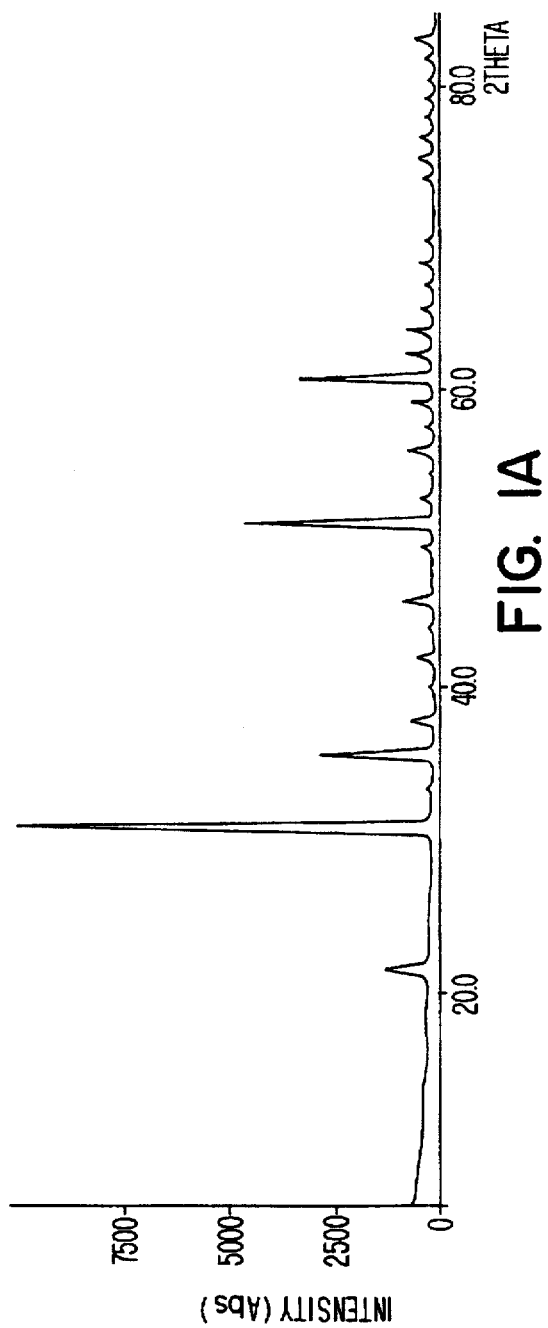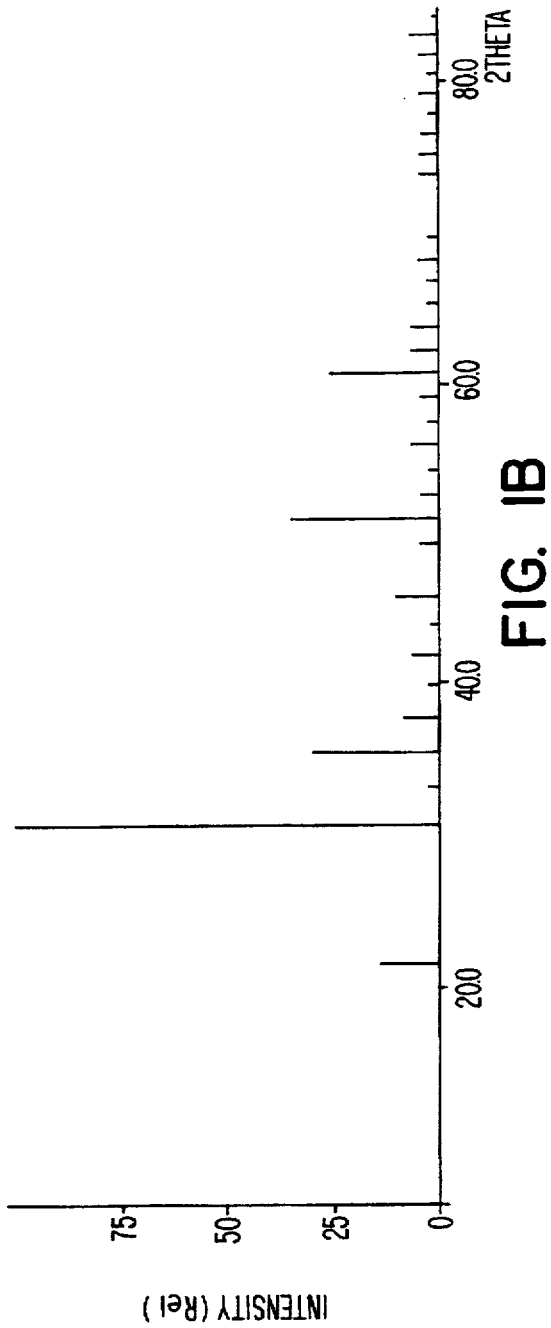

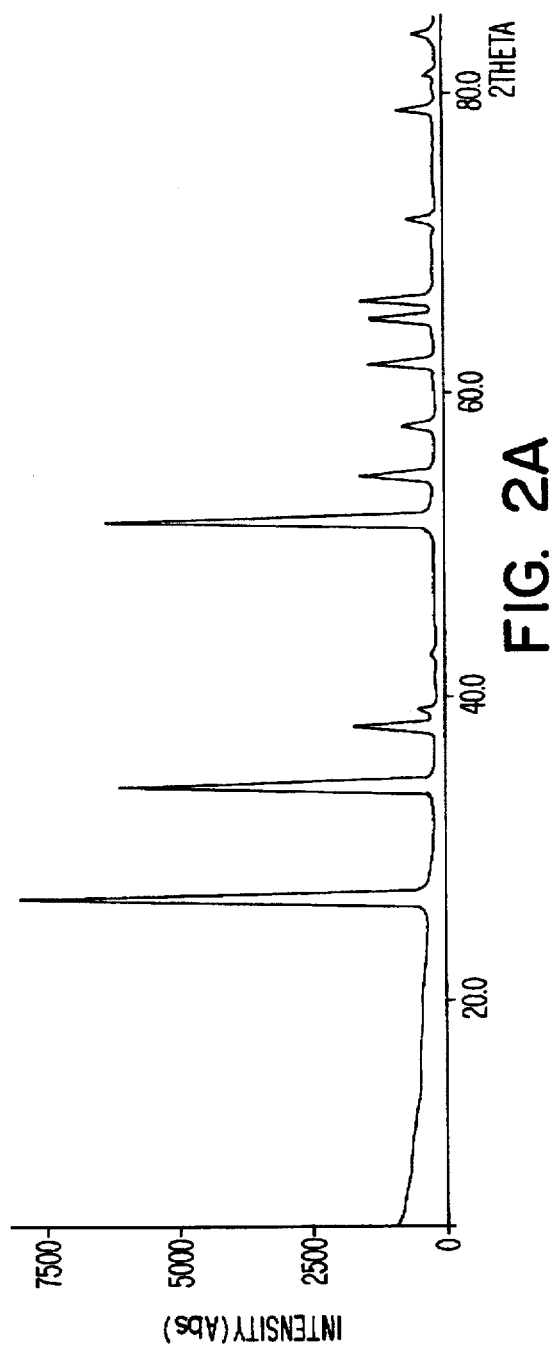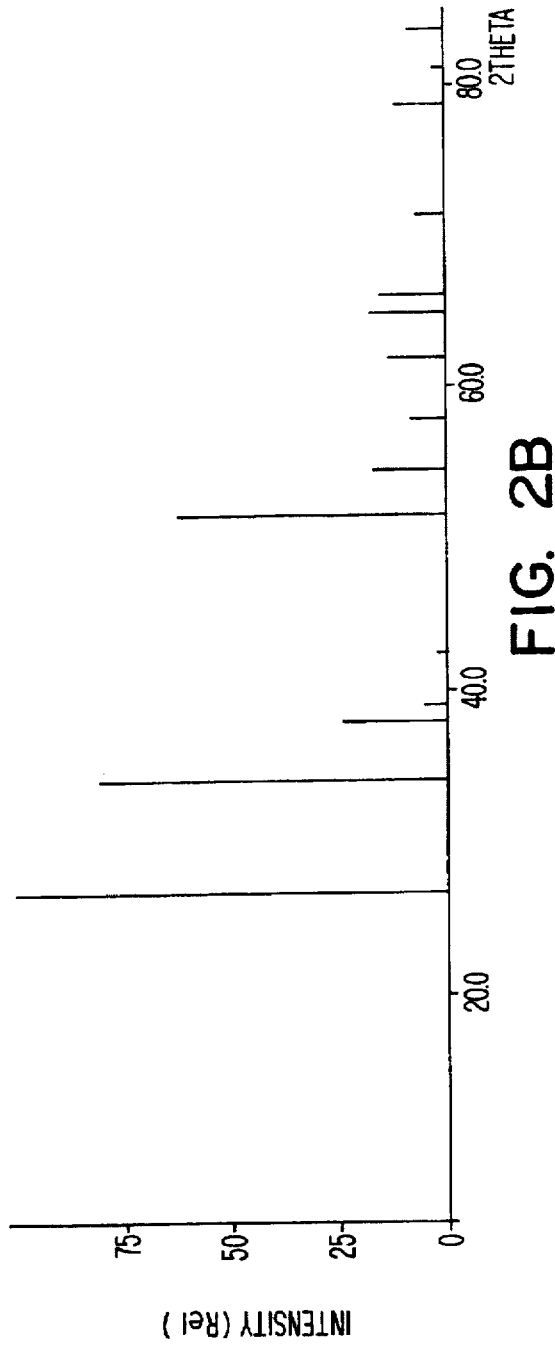

ically conductive InSnO$_x$ coatings. Another object

METHOD OF MANUFACTURE OF COMPONENTS MADE OF SINTERED INDIUM-TIN-OXIDE SOLID-SOLUTION CRYSTALS

BACKGROUND OF THE INVENTION

1. Field of the Invention

The present invention concerns a component made of sintered oxide particles of indium and tin. The mean size of the oxide particles is larger than 2 μm. The empirical density of the component is more than 95% of theoretical. The present invention also concerns a method of manufacturing such a component from such oxides by molding a green body out of a mixture of powdered indium-oxide and tin-oxide crystals and sintering the green body.

2. Background Information

Components of sintered oxides of indium and tin are employed, for example, as "ITO" (InSnO$_x$) targets, to sputter thin coatings of indium oxide and tin oxide onto various substrates. Such coatings are distinguished for transparency to visible light and for electric conductivity. These characteristics make them useful for manufacturing, for example, liquid crystal displays. The best starting material has heretofore been demonstrated to comprise 90% indium oxide to 10% tin oxide by weight.

Significant factors regarding the quality of the target, in addition to its homogeneity, purity, and degree of oxidation, are its density and microstructure. It has been demonstrated that a dense target results in a more uniform coating. European Patent Application A1 0 584 672 discloses indium-and-tin oxide sputtering targets with densities up to 99% of theoretical. The sintered oxide particles range in size from 1 to 20 μm. It has been demonstrated that the target becomes brittle when the particles are coarser than described hereinabove and that sputtering takes too long when they are too fine.

The target in EP-A1 0 584 672 is produced by mixing indium oxide and tin oxide, molding a green body therefrom, compacting it, optionally by cold-isostatic pressure, and sintering it for 5 hours in an oxygen-containing atmosphere at 1280° to 1600° C. The indium-oxide is obtained by precipitation from an aqueous medium. The indium oxide is very finely divided and has a BET (Brunauer-Emmett-Teller) surface area of more than 15 m$^2$/g. The starting powder is fine enough to ensure uniform distribution of the oxidic constituents. The target is distinguished for its density and for the transparency of the resulting coating. The target, however, is not only complicated to manufacture, but is also fragile.

Another procedure is known from "Structure and Performance of ITO Sputtering Targets" by B. E. Lewis et al, Arconium Specialty Alloys, Providence, R.I. 02909 (SVC-Proceedings, Boston (1994)). The Lewis et al article suggests increasing the density and, in particular, the conductivity by mixing the oxides, molding a green body out of the powdered crystals, and sintering it at ordinary pressure and at a temperature of more than approximately 1200° C. The resulting target consists of a solid solution of an extensively single-phase structure. The scientific basis for this procedure is evident from a phase diagram for indium oxide and tin oxide like that published by Enoki et al in *Journal of Materials Sciences*, 26 (1991), 4110–4115. This diagram demonstrates that the tin oxide in a mixture of 90% indium oxide to 10% tin oxide by weight will completely dissolve in the indium oxide at approximately 1500° K, producing a total crystal mixture.

The aforesaid Lewis et al article also describes procedures whereby mixtures of powders of the two oxides containing a small percentage of metallic indium are compacted in a mold and heated under pressure. It has been demonstrated that targets manufactured by this procedure include individual particles of tin oxide that decrease the electric conductivity of the target and hence the sputtering rate.

The known procedures allow for the manufacture of high-density components from oxides of indium and tin. However, the preparation of a homogeneous mixture of oxides has been problematic, necessitating very pure materials and complicated blending. The slow and high-temperature sintering required by the known procedures also demands a lot of energy.

A procedure for producing sputtering targets is described in the abstract for Japanese Patent Application 2-115326 A published in *Patent Abstracts of Japan*, Sect. C, Vol. 14 (1990), No. 322 (C-739). JP 2-115326A describes mixing powdered metallic tin with powdered indium oxide and then calcining the mixture in a reducing or non-oxidizing atmosphere. The resulting solid solution of oxides of indium and tin is ground up and hot-compressed into a block in a non-oxidizing atmosphere. The target is produced from the block.

SUMMARY OF THE INVENTION

One object of the present invention is to provide a component made of sintered oxides of indium and tin with high density and low fragility, that can be rapidly sputtered, and that will be appropriate for producing highly transparent and electrically conductive InSnO$_x$ coatings. Another object of the present invention is a particularly economical method of manufacturing components out of sintered oxides of indium and tin with a high specific density and a homogeneous crystalline structure.

The aforesaid first object is attained in accordance with the present invention by a component wherein at least 97% by weight of the oxide particles are crystals with a crystalline matrix of indium oxide. The oxide particles being in the form of mixed crystals ensures a particularly homogeneous distribution of indium and tin. This facilitates the production of uniform and homogeneous coatings of oxides of indium and tin on components in accordance with the present invention. The homogeneous and essentially single-phase solid solution matrix of the present invention significantly decreases the component's fragility. The single-phase solid solution structure allows for the production of highly conductive InSnO$_x$ coatings. These beneficial effects become even more pronounced as the percentage of the solid solution phase in the component increases. Such beneficial effects have not, on the other hand, been observed when the percentage of the solid solution phase in the crystalline matrix is less than 97% by weight.

The component according to the present invention with sintered oxide particles with a mean size of less than 20 μm has been demonstrated to be particularly beneficial. This characteristic has a particularly positive effect on the component's strength. An embodiment wherein the solid solution is in the indium-oxide matrix is preferred.

The aforesaid second object is attained in accordance with the present invention by a method wherein the sintering occurs at less than 1100° C. and preferably at between 800° and 1050° C.

BRIEF DESCRIPTION OF THE DRAWINGS

Various embodiments of the present invention will now be specified with reference to the drawings.

FIG. 1A and FIG. 1B are charts showing an X-ray analysis of the angle of diffraction of powdered indium oxide along with the associated literature values.

FIGS. 2A and 2B are charts showing an X-ray analysis of the angle of diffraction of powdered tin oxide along with the associated literature values.

DETAILED DESCRIPTION OF THE INVENTION

Figure 3:
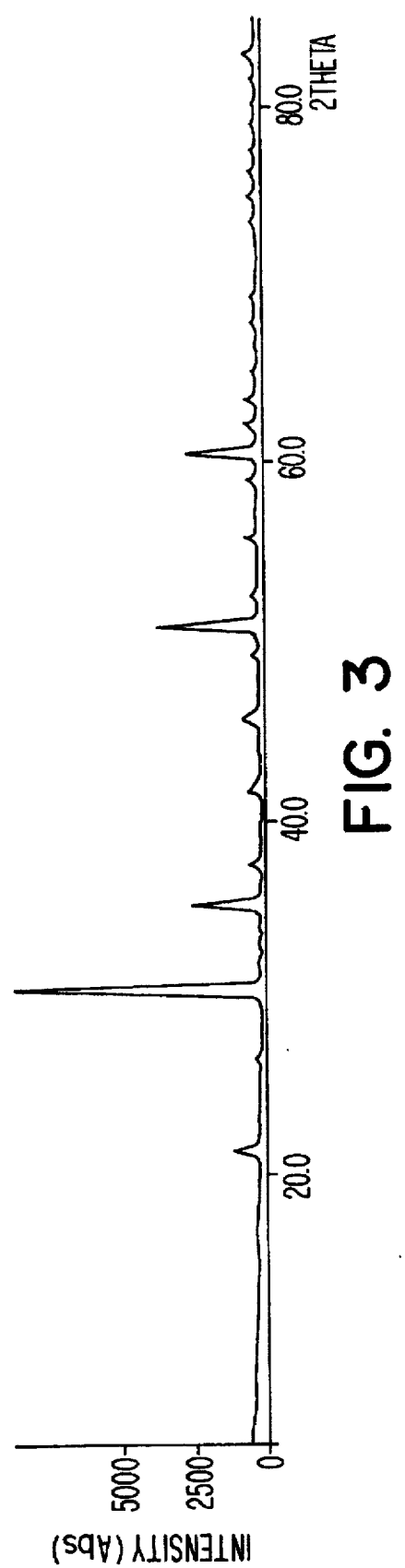
FIG. 3 is a chart showing an X-ray analysis of the angle of diffraction of the powdered mixed crystals employed to manufacture a component in accordance with the present invention.

An appropriate solid solution phase exhibits a diffraction angle of $2\Theta$ at approximately 30.5° in a X-ray powder diffractometer. The material can be in an indium-oxide crystal phase with tin oxide incorporated into the crystalline structure. It is considered that the indium ions at the lattice sites are replaced with tin ions. A solid solution powder essentially in the solid solution phase is preferred.

The preferred composition of the solid solution powder corresponds to 90 weight % indium oxide and 10 weight % tin oxide. The amount of indium oxide can vary in the range between 60 weight % and 95 weight %. The amount of tin oxide can vary in the range between 5 weight % and 40 weight %.

In the publication of Bates et al (*Ceramic Bulletin*, Vol. 65, No. 4 (1986), pages 673–678) values of the electrical conductivity for compositions in the above ranges are given. It is shown therein that the electrical conductivity reaches a maximum near 80 weight % indium oxide.

Since the method in accordance with the present invention proceeds not from a mixture of powdered crystals, but mainly or entirely from a crystal powder with a single solid solution phase, it is unnecessary to carry out the sintering at a temperature of more than 1200° C. to obtain a solid solution phase. A substantially lower sintering temperature can be employed. The method in accordance with the present invention is accordingly considerably more economical from the aspect of energy than the known method. Moreover, it has also been demonstrated that higher densities than can be obtained with known methods can sometimes be obtained by the method of the present invention.

When sintering occurs above 1100° C., the tin oxide can precipitate out of the solid solution phase. It is, on the other hand, of benefit to sinter at a temperature as high as possible in order to increase the density. It is advantageous to sinter at more than 800° C. and less than 1050° C. in order to obtain a component that is as dense as possible, while preventing as much tin oxide as possible from precipitating out of the crystal. Such temperatures are relatively low for sintering and thus make the method economical.

When the sintering occurs subject to conditions wherein chemical equilibrium becomes established relatively slowly in relation to sintering time, lower temperatures can be compensated for by longer times and vice versa. The sintering temperatures specified herein are to be considered guidelines only inasmuch as the same results can be obtained with lower temperatures and longer times.

It is particularly advantageous to compress the solid solution powder while it is being sintered. The result is satisfactory component density, which is economically provided without too much heat and without the associated precipitation of tin oxide out of the solid solution structure.

It is more advantageous to compress the solid solution powder hot-isostatically while it is being sintered. The result is uniform compaction of the solid solution powder in the green body and uniform density distribution in the sintered component.

Depending on the sintering parameters, the green body may be a loose agglomeration of the powder in bulk or it may be a green compact. In case it is intended to compress the powder hot, while it is being sintered, it is sufficient to have a green body consisting of loose powder in bulk. In case a hot isostatic pressing is intended, it has been found advantageous to have a more compact green body, which may be realized by prepressing the loose powder in a form.

The green body may have the rough dimensions of a typical sputter target or it may have the dimensions of an ingot, which is suitable to manufacture sputter targets by cutting appropriate pieces from it.

Pressures of 50 to 150 MPa and sintering times of 2 to 6 hours are preferred for the compression of the mixed-crystal powder.

Solid solution powders that have particle-size distributions resulting in a Brunauer-Emmett-Teller surface area of less than 5 and preferably less than 1 $m^2/g$ are preferred for manufacturing the target. Mean particle sizes ranging from 2 to 20 µm will lead to the desired BET surface area. When the particles are any larger, the component can be brittle, and, when they are any smaller, the target sputtering is too low.

It is evident from FIG. 1 that the major diffraction angle $2\Theta$ of indium oxide is approximately 30.5°. Subsidiary maxima are apparent at angles $2\Theta$ of approximately 21.5°, 35.5°, 51°, and 61°.

The most intense angles $2\Theta$ of tin oxide are 26°, 34°, and 52°, as is evident from FIG. 2A and FIG. 2B.

The X-ray data shown in FIG. 3 was obtained from a solid solution powder composed of 90% indium oxide and 10% tin oxide by weight. The powder's mean particle size was approximately 3 µm and its specific BET surface area was 0.3 $m^2/g$. The diffraction chart exhibits five definite peaks of intensity. The maximum is at 30.5°, which is the major diffraction angle of the powdered indium oxide. Lower peaks are evident at 21.5°, 35.5°, 51°, and 61°, as in the chart of indium oxide.

There is a low peak at the diffraction angle $2\Theta$ of approximately 26°, which is the major diffraction angle of tin oxide. The empirical intensity, however, is considerably lower than would be expected from the percentage by weight of tin oxide in the mixture. The height of the intensity peak suggests rather a participation of approximately 2% by weight for the tin-oxide phase, and the powder is accordingly essentially single-phase.

EXAMPLES

Three sample components were hot-isostatically pressed from a powder consisting of 90 weight % indium oxide and 10 weight % tin oxide, but with only one mixed oxide phase. The powders were for this purpose encapsulated in a steel jacket and sintered for three hours at 100 MPa. Each sample was sintered at a different temperature, and the other processing parameters were identical. Sample 1 was sintered at 870° C.; Sample 2 was sintered at 970° C.; and Sample 3 was sintered at 1070° C.

Figure 4A:
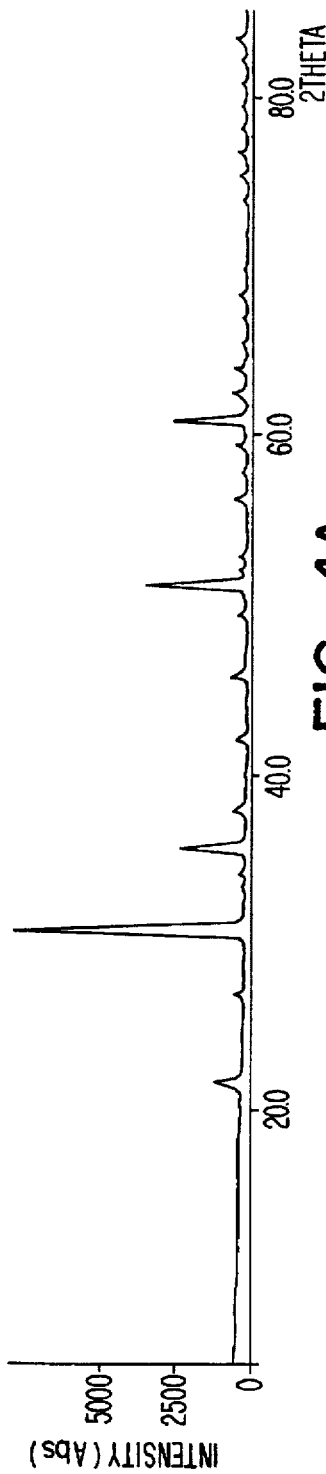
FIG. 4A, FIG. 4B and FIG. 4C are charts showing an X-ray analysis of the angle of diffraction of components manufactured in accordance with the present invention subsequent to sintering at different temperatures.
Figure 4B:
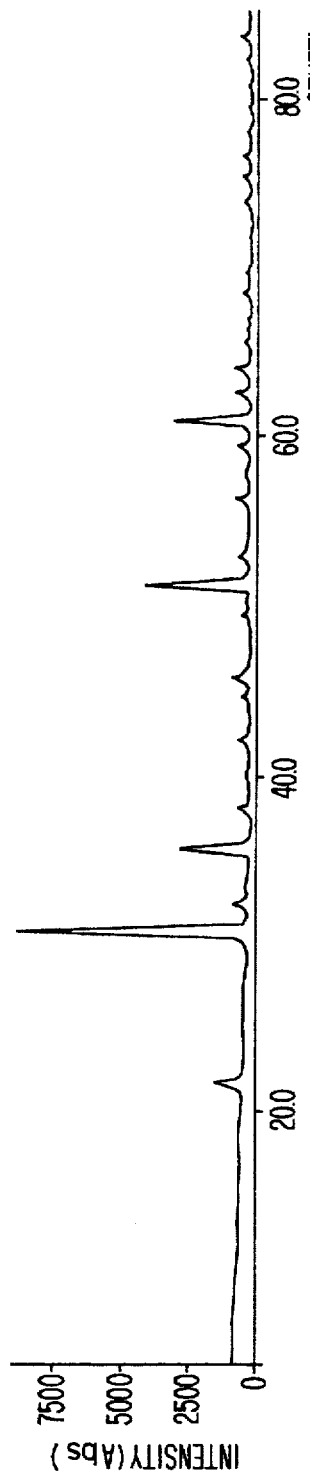
Figure 4C:
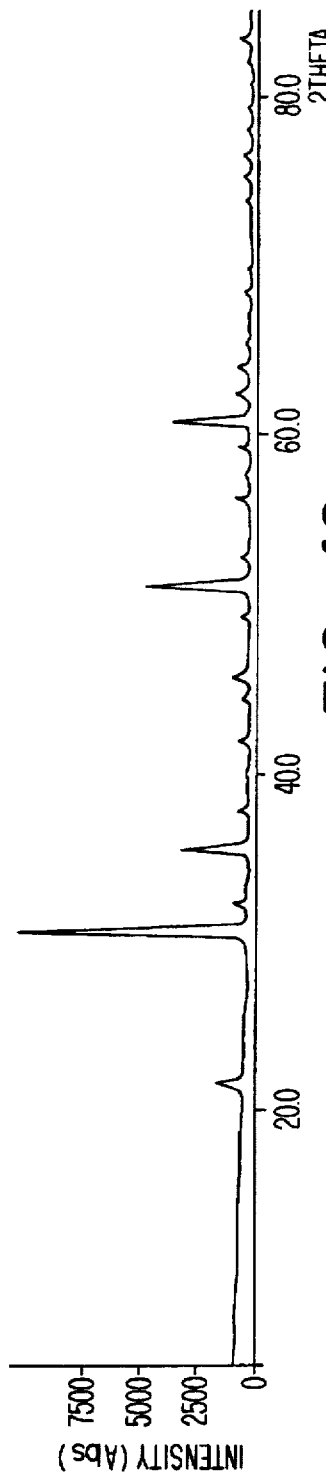

FIG. 4A, FIG. 4B and FIG. 4C illustrate the diffraction angles obtained for the three samples. The intensities obtained foe Sample 1 hardly differ from those obtained for Sample 2. They essentially correspond to that of the starting powder and to that obtained for indium oxide as illustrated in FIG. 1A and FIG. 1B. It is only at an angle of diffraction of approximately 32.1° that a low additional maximal intensity can be observed, which can, however, be ascribed to neither indium oxide nor tin oxide.

It is only in Sample 3, which was sintered at a temperature of 1070° C., that the plot of intensity varies. There is a low intensity peak at approximately 26° C., which identifies a tin-oxide crystalline phase. This second crystal phase should be avoided to the greatest extent possible. The specific densities of the samples are as follows:

| Sample | Densities in g/m³ |
|--------|-------------------|
| 1      | 7.03              |
| 2      | 7.06              |
| 3      | 7.08              |

The theoretical density is approximately 7.14 g/m³. The empirical densities accordingly are all in the vicinity of 99% of theoretical. Since Sample 3 is not substantially denser than Samples 1 and 2 and since the tin oxide has already precipitated out in the form of a second phase during the sintering, the optimal sintering temperature in this event will be below 1070° C. at normal processing parameters.

The sintering temperature, however, could also be higher without the tin-oxide crystal phase precipitating out if the sintering time is abbreviated. This is possible because of the more rapid sintering that occurs at higher temperatures with no sacrifice of density.

In a most preferred embodiment, a reducing atmosphere is established during sintering. The resulting sample has a high density and shows a metallic phase finely dispersed between the crystalline oxide matrix.

Various changes and modifications may be made, and features described in connection with any of the embodiments may be used with any of the others, within the scope of the inventive concept.

We claim:

1. A method of manufacturing components from oxides of indium and tin comprising:

molding a green body from particles of a powder, wherein at least 97% by weight of the particles comprise indium-tin-oxide solid-solution crystals with a crystalline matrix of indium oxide, and sintering the green body at a temperature of 800° to 1100° C., while the green body is compressed hot.

2. The method as in claim 1, wherein the sintering occurs at a temperature of 800° to 1050° C.

3. The method as in claim 1, wherein the solid solution of powdered indium oxide and tin oxide crystals is compressed isostatically while it is being sintered.

4. The method as in claim 1, wherein the Brunauer-Emmett-Teller (BET) surface area of the powder is less than 5 m²/g.

5. The method as in claim 4, wherein the BET surface area of the powder is less than 1 m²/g.

6. The method as in claim 1, wherein the sintering is carried out at a pressure of 50 to 150 MPa.

7. The method as in claim 1, wherein the sintering is carried out for 2 to 6 hours.

8. The method as in claim 3, wherein the sintering is carried out at a pressure of 50 to 150 MPa, for a time of 2 to 6 hours and at a temperature of 800° to 1050° C.

9. The method as in claim 5, wherein the sintering is carried out at a pressure of 50 to 150 MPa, for a time of 2 to 6 hours and at a temperature of 800° to 1050° C.

10. The method as in claim 1, wherein the sintering is carried out in a reducing atmosphere.

11. The method as in claim 1, wherein the sintered green body has a density of 7.03 to 7.08 g/m³.

* * * * *